United States Patent
Westmoreland et al.

(10) Patent No.: US 10,936,686 B2
(45) Date of Patent: Mar. 2, 2021

(54) METHOD AND SYSTEM FOR ASYNCHRONOUS CORRELATION OF DATA ENTRIES IN SPATIALLY SEPARATED INSTANCES OF HETEROGENEOUS DATABASES

(71) Applicant: Proof of Concept LLC, Austin, TX (US)

(72) Inventors: Andrew Westmoreland, Austin, TX (US); Timothy Hanus, Austin, TX (US)

(73) Assignee: Proof of Concept LLC, Austin, TX (US)

(*) Notice: Subject to any disclaimer, the term of this patent is extended or adjusted under 35 U.S.C. 154(b) by 162 days.

(21) Appl. No.: 16/124,889

(22) Filed: Sep. 7, 2018

(65) Prior Publication Data
US 2019/0087387 A1     Mar. 21, 2019

Related U.S. Application Data

(60) Provisional application No. 62/555,182, filed on Sep. 7, 2017, provisional application No. 62/679,398, filed
(Continued)

(51) Int. Cl.
*G06F 16/9535*     (2019.01)
*G06F 16/957*      (2019.01)
*H04L 29/08*       (2006.01)

(52) U.S. Cl.
CPC ...... *G06F 16/9535* (2019.01); *G06F 16/9574* (2019.01); *H04L 67/146* (2013.01); *H04L 67/22* (2013.01); *H04L 67/306* (2013.01)

(58) Field of Classification Search
CPC ...... G06F 16/95–16/9574; H04L 67/00–67/42
See application file for complete search history.

(56) References Cited

U.S. PATENT DOCUMENTS

2016/0364490 A1* 12/2016 Maugans, III ...... H04L 63/0407

OTHER PUBLICATIONS

Westmoreland, Andrew B., et al., "Method and System for Asynchronous Correlation of Data Entries in Spatially Separated Instances of Heterogenous Databases" filed Sep. 7, 2017, U.S. Appl. No. 62/555,182.
(Continued)

*Primary Examiner* — Clayton R Williams

(57) ABSTRACT

A computer-implemented method including forming a first user information database stored on a first server by retrieving, from a browser session, a first piece of user information including at least local user identification data and storing the first piece of user information in a user profile of the first user information database. The method further includes querying the first user information database for a second piece of user information. Responsive to not identifying the second piece of user information in the first user information database, the method further includes querying a second user information database stored on a second server for the second piece of user information associated with the first piece of user information. The method further includes retrieving the second piece of user information from the second database and saving the second piece of user information to the user profile of the first user information database.

20 Claims, 7 Drawing Sheets

Related U.S. Application Data on Jun. 1, 2018, provisional application No. 62/679,427, filed on Jun. 1, 2018, provisional application No. 62/688,923, filed on Jun. 22, 2018, provisional application No. 62/717,219, filed on Aug. 10, 2018, provisional application No. 62/713,446, filed on Aug. 1, 2018.

(56) References Cited

OTHER PUBLICATIONS

"Westmoreland, Andrew B., et al., ""Method and System for Asynchrononous Correlation of Data Entries in Spatial Instances of Heterogeneous Databases"" filed Jun. 1, 2018, U.S. Appl. No. 62/679,389."

Westmoreland, Andrew B., et al., "Method and System for Data Collection and Aggregation in Heterogeneous Databases" filed Jun. 1, 2018, U.S. Appl. No. 62/679,427.

Westmoreland, Andrew B., et al., "Method and System for Asynchronous Correlation of Data Entries in Spatial Instances of Heterogeneous Databases" filed Jun. 22, 2018, U.S. Appl. No. 62/688,923.

Westmoreland, Andrew B., et al., "Method, Apparatus, and System for Receiving and Storing Non-Schema Data Entries in Spatial Instances of Heterogeneous Databases" filed Aug. 1, 2018, U.S. Appl. No. 62/713,446.

Westmoreland, Andrew B., et al., "Method, Apparatus, and System for Receiving and Weighting Non-Schema Data Entries in Spatial Instances of Heterogeneous Databases" filed Aug. 10, 2018, U.S. Appl. No. 62/717,219.

Westmoreland, Andrew B., et al., "Method and System for Determining Transfer of Asynchronous Correlation of Data Entries in Spacial Instances of Heterogenous Databases" filed Dec. 3, 2018, U.S. Appl. No. 62/174,692.

Westmoreland, Andrew B., et al., "Method, Apparatus, and System for Receiving and Weighting Non-Schema Data Entries in Spatial Instances of Heterogeneous Databases," filed Aug. 9, 2019, U.S. Appl. No. 16/537,510.

Westmoreland, Andrew B., et al., "Method Apparatus and System for Receiving and Weighting Nonschema Data Entries in Spatial Instances of Heterogeneous Databases," filed Aug. 1, 2019, U.S. Appl. No. 16/529,783.

Westmoreland, Andrew B., et al., "Method and System for Asynchronous Correlation of Data Entries in Spatially Separated Instances of Heterogenous Databases," filed Dec. 3, 2019, U.S. Appl. No. 16/702,337.

Westmoreland, Andrew B., et al., "Method and System for Asynchronous Correlation of Data Entries in Spatially Separated Instances of Heterogenous Databases," filed Aug. 1, 2019, U.S. Appl. No. 16/529,755.

Westmoreland, Andrew B., et al., "Method and System for Asynchronous Correlation of Data Entries in Spatially Separated Instances of Heterogenous Databases," filed Aug. 1, 2019, U.S. Appl. No. 16/529,770.

Westmoreland, Andrew B., et al., "Method and System for Asynchronous Correlation of Data Entries in Spatially Separated Instances of Heterogenous Databases," filed Aug. 2, 2019, U.S. Appl. No. 16/529,788.

* cited by examiner

US 10,936,686 B2

METHOD AND SYSTEM FOR ASYNCHRONOUS CORRELATION OF DATA ENTRIES IN SPATIALLY SEPARATED INSTANCES OF HETEROGENEOUS DATABASES

CROSS-REFERENCES AND CLAIMS OF PRIORITY TO RELATED APPLICATIONS

This application claims priority under 35 U.S.C. § 119(e) to U.S. Provisional Patent Application No. 62/555,182 filed on Sep. 7, 2017. The above-identified provisional patent application is hereby incorporated by reference in its entirety. This application further claims priority under 35 U.S.C. § 119(e) to U.S. Provisional Patent Application No. 62/679,398 filed on Jun. 1, 2018. The above-identified provisional patent application is hereby incorporated by reference in its entirety. This application further claims priority under 35 U.S.C. § 119(e) to U.S. Provisional Patent Application No. 62/679,427 filed on Jun. 1, 2018. The above-identified provisional patent application is hereby incorporated by reference in its entirety.

BACKGROUND

The present disclosure relates to storing user data from web browsing sessions in a user profile and retrieving a specific subset of the stored user data.

Websites are capable of tracking users who visit and interact with the websites by storing a cookie on the user's web browser. The data stored by the cookie may be saved to a database associated with the website. The term "cookie" is generally used to refer to a piece of data sent from a website and stored by the web browser. The stored data may be data for known users (e.g. users that have registered with the website, for example by making an account) or the stored data may be data for anonymous users (e.g. users that have not registered with the website). It is often difficult to match the data for an anonymous user to a known user or a known identity across multiple websites or databases.

SUMMARY

In one embodiment, the disclosure provides a system including a first server in communication with a first computing system including a first memory and at least one processor. The system further includes a second server in communication with a second computing system, the second computing system including a second memory and a second processor. The second server is in communication with the first server. The first memory includes program instructions executable by the at least one processor of the first computing system to: retrieve, from a browser session, a first piece of user information that includes at least anonymous user identification data; store the first piece of user information in a user profile in the first memory; and responsive to identifying a match of the first piece of user information with a match in a database of user information stored in the second memory, store a second piece of user information in the user profile in the first memory.

In another embodiment, the disclosure provides a computer-implemented method including retrieving, from a browser session, a first piece of user information that includes at least anonymous user identification data. The method further includes storing the first piece of user information in a user profile stored on a first server. The method further includes querying a plurality of databases stored on servers different than the first server for a plurality of matches related to the first piece of information. Responsive to identifying a match in one of the plurality of databases, the method includes retrieving a second piece of user information from the one of plurality of databases and storing the second piece of user information in the user profile.

In another embodiment, the disclosure provides a computer-implemented method including forming a first user information database stored on a first server by retrieving, from a browser session, a first piece of user information that includes at least local user identification data and storing the first piece of user information in a user profile of the first user information database. The method further includes querying the first user information database for a second piece of user information. Responsive to not identifying the second piece of user information in the first user information database, the method further includes querying a second user information database stored on a second server for the second piece of user information associated with the first piece of user information. The method further includes retrieving the second piece of user information from the second database and saving the second piece of user information to the user profile of the first user information database.

Other aspects of the invention will become apparent by consideration of the detailed description and accompanying drawings.

DETAILED DESCRIPTION

Figure 1:
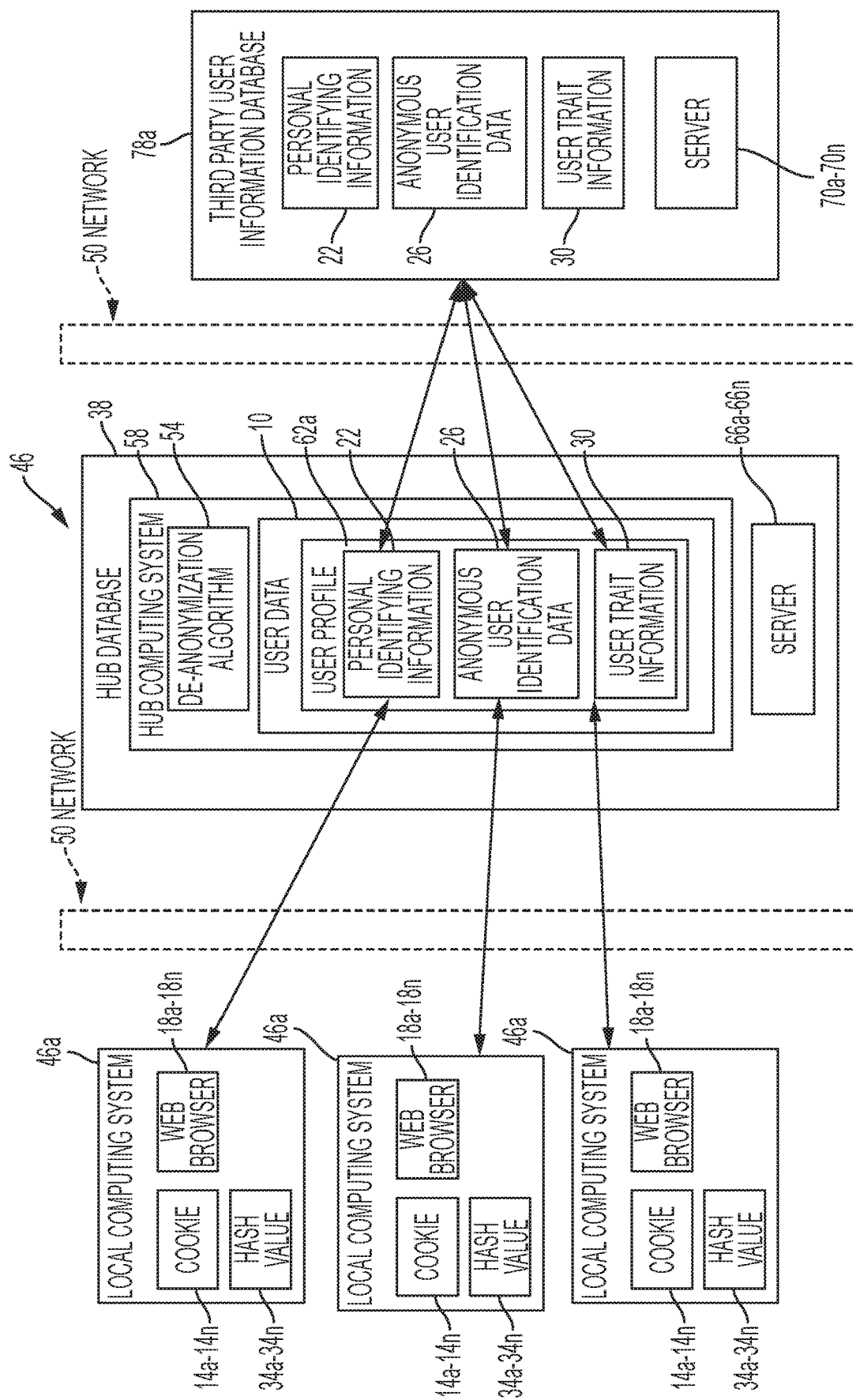
FIG. 1 illustrates a data infrastructure, including a local computing device, a hub database, and a plurality of third party databases according to some embodiments.

Before any embodiments of the disclosure are explained in detail, it is to be understood that the disclosure is not limited in its application to the details of construction and the arrangement of components set forth in the following description or illustrated in the following drawings. The disclosure is capable of other embodiments and of being practiced or of being carried out in various ways. Also, it is to be understood that the phraseology and terminology used herein is for the purpose of description and should not be regarded as limiting. The use of "including", "comprising", or "having" and variations thereof herein is meant to encompass the items listed thereafter and equivalents thereof as well as additional items. As used herein, the word "may" is used in a permissive sense (e.g. meaning having the potential to) rather than the mandatory sense (e.g. meaning must).

Some portions of the detailed description which follow are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and is generally, considered to be a self-consistent sequence of operations or similar signal processing leading to a desired result. In this context, operations or processing involve physical manipulation of physical quantities.

Typically, although not necessarily, such quantities may take the form of electrical or magnetic signals capable of being stored, transferred, combined, compared, or otherwise manipulated. It has been proven convenient at times, principally for reasons of common usage, to refer to signals as bits, data, values, elements, symbols, characters, terms, numbers, numerals, or the like. It should be understood, however, that all of these or similar terms are to be associated with appropriate physical quantities and are merely convenient labels. Unless specifically stated otherwise, the terms "processing", "computing", "calculating", "determining" or the like refer to actions or processes of a specific apparatus, such as a special purpose computer or a similar special purpose electronic computing device. In the context of this specification, therefore, a special purpose computer or similar special purpose electronic computing device is capable of manipulating or transforming signals, typically represented as physical electronic or magnetic quantities within memories, registries, or other information storage devices, transmission devices, or display devices of the special purpose computer or similar special purpose electronic computing device. The use of the variable "n" is intended to indicate that a variable number of local computing devices may be in communication with the network.

In some embodiments, a system includes a first server in communication with a first computing system including a first memory and at least one processor. In some embodiments, the system includes a second server in communication with a second computing system. In some embodiments, the second computing system includes a second memory and a second processor. In some embodiments, the second server is in communication with the first server. In some embodiments, the first memory includes program instructions executable by the at least one processor of the first computing system to retrieve, from a browser session, a first piece of user information that includes at least anonymous user identification data, store the first piece of user information in a user profile in the first memory, and, responsive to identifying a match of the first piece of user information with a match in a database of user information stored in the second memory, store a second piece of user information in the user profile in the first memory.

In some embodiments, the second piece of user information includes one of a gender, a postal address, an age group, or a user interest. In some embodiments, the second piece of user information includes a hash value. In some embodiments, the user profile is one of a plurality of user profiles, and further includes program instructions executable to query the plurality of user profiles for the second piece of user information, responsive to identifying a match in one of the user profiles of the plurality of user profiles, and retrieve the first piece of user information.

In some embodiments, the first piece of user information is provided to an operator. In some embodiments, the first piece of user information corresponds to a user and the program instructions further include program instructions executable to calculate a probability that the second piece of user information corresponds to the user.

In some embodiments, the first memory includes program instructions executable by the at least one processor of the first computing system to store an identity of the database of user information to the user profile in the first memory, and associate the identity of the database stored in the second memory with the second piece of user information stored in the first memory.

Some embodiments disclose a computer-implemented method, including retrieving, from a browser session, a first piece of user information that includes at least anonymous user identification data, storing the first piece of user information in a user profile stored on a first server, querying a plurality of databases stored on servers different than the first server for a plurality of matches related to the first piece of information, responsive to identifying a match in one of the plurality of databases, retrieving a second piece of user information from the one of plurality of databases, and storing the second piece of user information in the user profile.

In some embodiments, the second piece of user information includes one of a gender, a postal address, an age group, or a user interest.

In some embodiments, the user profile is one of a plurality of user profiles, and the method further includes querying the plurality of user profiles for a third piece of user information, and responsive to identifying a match in one of the user profiles of the plurality of user profiles, retrieving the first piece of user information. In some embodiments, the first piece of user information is provided to a consumer. Some embodiments further comprise calculating a probability that the third piece of user information corresponds to the same user as the first piece of user information.

In some embodiments, a non-transitory, computer-readable storage medium stores one or more executable instructions that, when executed by at least one processor, causes the at least one processor to retrieve, from a browser session, a first piece of user information that includes at least anonymous user identification data, store the first piece of user information in a user profile stored on a first server, query a plurality of databases stored on servers different than the first server for a plurality of matches related to the first piece of information, responsive to identifying a match in one of the plurality of databases, retrieve a second piece of user information from the one of plurality of databases, and store the second piece of user information in the user profile.

In some embodiments, the second piece of user information includes one of a gender, a postal address, an age group, or a user interest. In some embodiments, the user profile is one of a plurality of user profiles, and the computer-readable storage medium further stores instructions that, when executed by at least one processor, cause the at least one processor to query the plurality of user profiles for a third piece of user information, and responsive to identifying a match in one of the user profiles of the plurality of user profiles, retrieve the first piece of user information. In some embodiments, the first piece of user information is provided to a consumer.

In some embodiments, the computer-readable storage medium further stores instructions that, when executed by at least one processor, cause the at least one processor to calculate a probability that the third piece of user information corresponds to the same user as the first piece of user information.

Some embodiments disclose a computer-implemented method, including forming a first user information database stored on a first server by retrieving, from a browser session, a first piece of user information that includes at least local user identification data and storing the first piece of user information in a user profile of the first user information database, querying the first user information database for a second piece of user information, responsive to not identifying the second piece of user information in the first user information database, querying a second user information database stored on a second server for the second piece of user information associated with the first piece of user information, retrieving the second piece of user information from the second database, and saving the second piece of user information to the user profile of the first user information database.

In some embodiments, the first piece of information includes a cookie or a hash value. In some embodiments, the second piece of user information includes at least anonymous user identification data related to the first piece of user information, and the method further includes querying a third user information database stored on a third server, the third user information database different than the second user information database, with the second piece of user information, and identifying a match in the third database, and saving the third piece of user information to the user profile in the first user information database.

In some embodiments, the third piece of user information includes personal identifying information. In some embodiments, the personal identifying information includes one of a gender, a postal address, an age group, or a user interest. In some embodiments, the method further includes providing both the first piece of user information and the second piece of user information to a consumer.

In some embodiments, the first piece of user information corresponds to a user, and the method further includes calculating a probability that the third piece of user information corresponds to the user. In some embodiments, the method further providing the third piece of user information to a consumer if the probability that the third piece of user information corresponds to the user is at least a predetermined probability.

Some embodiments include a non-transitory, computer-readable storage medium storing one or more executable instructions that, when executed by at least one processor, causes the at least one processor to form a first user information database stored on a first server by retrieving, from a browser session, a first piece of user information that includes at least local user identification data and storing the first piece of user information in a user profile of the first user information database, query the first user information database for a second piece of user information, responsive to not identifying the second piece of user information in the first user information database, query a second user information database stored on a second server for the second piece of user information associated with the first piece of user information, and retrieve the second piece of user information from the second database and saving the second piece of user information to the user profile of the first user information database.

In some embodiments, the first piece of information includes a cookie or a hash value. In some embodiments, the second piece of user information includes at least anonymous user identification data related to the first piece of user information, and the non-transitory, computer-readable storage medium storing one or more executable instructions that further includes instructions that, when executed by at least one processor, cause the at least one processor to query a third user information database stored on a third server, the third user information database being different than the second user information database, with the second piece of user information, and identify a match in the third database, and saving the third piece of user information to the user profile in the first user information database.

In some embodiments, the third piece of user information includes personal identifying information. In some embodiments, the personal identifying information includes one of a gender, a postal address, an age group, or a user interest.

In some embodiments, the non-transitory, computer-readable storage medium storing one or more executable instructions that further includes instructions that, when executed by at least one processor, cause the at least one processor to provide both the first piece of user information and the second piece of user information to a consumer.

In some embodiments, the first piece of user information corresponds to a user, and the non-transitory, computer-readable storage medium storing one or more executable instructions that further includes instructions that, when executed by at least one processor, cause the at least one processor to calculate a probability that the third piece of user information corresponds to the user.

In some embodiments, the non-transitory, computer-readable storage medium storing one or more executable instructions that further includes instructions that, when executed by at least one processor, cause the at least one processor to provide the third piece of user information to a consumer if the probability that the third piece of user information corresponds to the user is at least a predetermined probability.

In some embodiments, a system includes a first server in communication with a first computing system including a first memory and at least one processor, and a second server in communication with a second computing system. In some embodiments, the second computing system includes a second memory and a second processor, and the second server is in communication with the first server. In some embodiments, the first memory includes program instructions executable by the at least one processor of the first computing system to form a first user information database stored on the first server by retrieving, from a browser session, a first piece of user information that includes at least local user identification data and storing the first piece of user information in a user profile of the first user information database, query the first user information database for a second piece of user information, responsive to not identifying the second piece of user information in the first user information database, query a second user information database stored on the second server for the second piece of user information associated with the first piece of user information, and retrieve the second piece of user information from the second database and saving the second piece of user information to the user profile of the first user information database.

In some embodiments, first piece of information includes a cookie or a hash value.

In some embodiments, the second piece of user information includes at least anonymous user identification data related to the first piece of user information, and the first memory includes program instructions executable by the at least one processor of the first computing system to query a third user information database stored on a third server, the third user information database different than the second user information database, with the second piece of user information, identify a match in the third database, and save the third piece of user information to the user profile in the first user information database.

In some embodiments, the third piece of user information includes personal identifying information.

In some embodiments the personal identifying information includes one of a gender, a postal address, an age group, or a user interest.

In some embodiments, the first memory includes program instructions executable by the at least one processor of the first computing system to provide both the first piece of user information and the second piece of user information to a consumer.

In some embodiments, the first piece of user information corresponds to a user, and the first memory includes program instructions executable by the at least one processor of the first computing system to calculate a probability that the third piece of user information corresponds to the user.

In some embodiments, the first memory includes program instructions executable by the at least one processor of the first computing system to provide the third piece of user information to a consumer if the probability that the third piece of user information corresponds to the user is at least a predetermined probability.

User data 10 from web browsing sessions may be stored by cookies 14a-14n associated with a web browser 18. The user data 10 stored in the cookies 14a-14n may then be transferred to a database of users. The user data 10 may include personal identifying information 22, anonymous user identification data 26, or user trait information 30. The personal identifying information 22 is information that corresponds to a specific person, such as a name, an email address, a postal address, a phone number, a photographic image, an IP address, and/or any other personal characteristic that can be used for identification.

The anonymous user identification data 26 is data that is specific to a particular anonymous user, and can be used to identify that particular anonymous user, but does not provide personal identifying information 22 about the particular anonymous user. Anonymous user identification data 26 may include a name of a cookie 14 or a value 34 of a hash function. The term "hash function" is generally used to refer to any well-defined procedure or mathematical function that converts a large, possibly variable-sized amount of data into a small datum. The values 34a-34n returned by a hash function are called hash values, hash codes, hash sums, checksums, or simply hashes. Hash functions or hash values 34a-34n can be compared to determine the likelihood that a piece of newly identified user data 10 matches a particular anonymous user who has been assigned to a piece of anonymous user identification data 26. For example, a hash value 34a-34n may be used to match a piece of personal identifying information 22 with a piece of anonymous user identification data 26.

The user trait information 30 is information about a user such as age group, gender, interests, geographical region, travel habits, length of a browsing session, time of day of a browsing session, purchasing habits, travel preferences, clothing preferences, income level, residential information, and/or any other information that may be associated with a person.

FIG. 1 illustrates a data infrastructure 42 according to some embodiments of the present disclosure. As shown in FIG. 1, the data infrastructure 42 includes a plurality of local computing devices 46a-46n in communication with a network 50. The term "local computing device" is used to refer to a computing device used directly by a user, such as a desktop computer, a laptop computer, a smart phone, a game console, a tablet computer, or any other device capable of communicating with the web browser 18a-18n over the network 50. In the illustrated embodiment, the local computing devices 46a-46n may be independent of one another. Each of the local computing devices 46a-46n may be autonomously administered by different entities (e.g. different home users or different companies) and may or may not share content or interact with each other. Each local computing device 46a-46n may have the same users, different users, or different sets of users.

According to various embodiments, a de-anonymization algorithm 54 is implemented by a processor of one or more hub computing systems 58 to harvest the user data 10 from the cookies 14a-14n of the web browsers 18a-18n of local computing devices 46a-46n and to store the user data 10 in user profiles 62a-62n stored in the one or more hub databases 38 saved to the one or more hub computing systems 58a-58n of a computer cluster, data center, and/or any other hardware configuration. In some embodiments, the data infrastructure 42 may include various internal APIs (e.g., RDBMS, software libraries, etc.) for internal access to the user data 10 or the user profiles 62a-62n. The term "hub database" is generally used to refer to the database 38 produced by the de-anonymization algorithm 54. The term "hub computing system" is generally used to refer to the computing system or computing systems 58 that run the de-anonymization algorithm 54. The hub computing system 58 is in communication with a server 66 that is in turn in communication with other servers 70a-70n in communication with other computing systems 74a-74n including third-party user information databases 78a-78n.

According to various embodiments, the de-anonymization algorithm 54 may access, retrieve, aggregate, and/or analyze user data 10 including personal identifying information 22, anonymous user identification data 26, and user trait information 30 stored in one or more cookies 14a-14n stored on one or more web browsers 18a-18n and add the newly matched user data 10 to the hub database 38. In some embodiments, the de-anonymization algorithm 54 is configured to query the hub database 38 to retrieve content relevant to a piece of user trait information 30 of interest to obtain a list of personal identifying information 22 from the user profiles 62a-62n that include the specific piece of user trait information 30.

Figure 2:
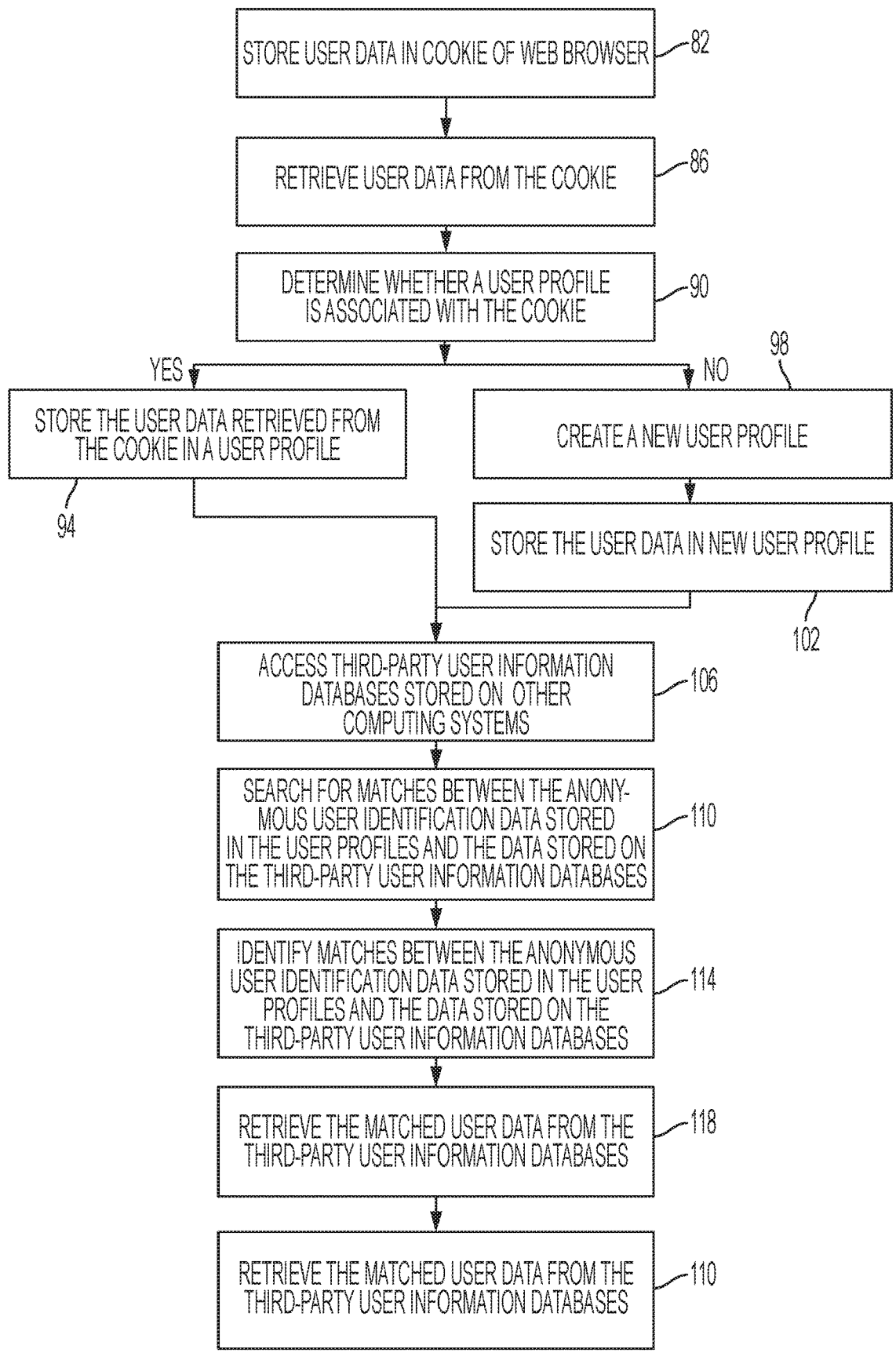
FIG. 2 illustrates a flow diagram of a method for converting local anonymous user data into personal identifying information of a user.

FIG. 2 illustrates a flow diagram showing the operations performable in retrieving the user data 10 stored in the at least one cookie 14a-14n of the at least one web browser 18a-18n in a user profile 62a-62n of the hub database 38 and matching the user 10 stored in the user profile 62a-62n with user data 10 stored on the third-party user information databases 78a-78n. The operations will be described for one local computing device 46. The same procedure may be used for multiple local computing devices 46a-46n. As an initial step, the user data 10 is stored in the cookie 14a-14n of the web browser 18a-18n (block 82). The user data 10 could consist of data input by the user (for example, a user name or a search query), links clicked by the user, or hash values generated in response to user input or user behavior. The user data 10 is retrieved from the cookie 14a-14n (block 86). The hub database 38 is queried to determine whether there is a user profile 64a-64n associated with the cookie 14a-14n (block 90). If there is a user profile 64a-64n associated with the cookie 14a-14n, the user data 10 retrieved from the cookie 14a-14n is added to the user profile 64a-64n (block 94). If there is not a user profile 64a-64n associated with the cookie 14a-14n, a new user profile 64a-64n is created for data from the cookie 14a-14n (block 98). The user data 10 retrieved from the cookie 14a-14n is added to the new user profile 61a-64n (block 102).

With continued reference to FIG. 2, the de-anonymization algorithm 54 accesses the third-party user information databases 78a-78n stored on other computing systems 74a-74n (block 106). The de-anonymization algorithm 54 searches for matches between the anonymous user identification data 26 in the user profiles 62a-62n and the anonymous user identification data 26 stored in the third party user information databases 78a-78n (block 110). In some embodiments, the anonymous user identification data 26 includes the names of the cookies 14a-14n. In other embodiments, the anonymous user identification data 26 includes hash values 34a-34n. In other embodiments, the anonymous user identification data 26 is both the names of the cookies 14a-14n and hash values 34a-34n. When the de-anonymization algorithm 54 identifies a match between the anonymous user identification data 26 stored in the user profiles 62a-62n and the anonymous user identification data 26 stored in a third-party user information database 78a-78n (block 114), the de-anonymization algorithm 54 retrieves the user data 10 associated with the anonymous user identification data 26 (block 118) and stores the user data 10 in the user profile 62a-62n in the hub database 38 (block 122). The user data 10 and the identity of the third-party user information databases 78a-78n from which the user data 10 was obtained is stored in the user profile 62a-62n as is described in more detail below. In the illustrated embodiment, the user data 10 may include personal identifying information 22, anonymous user identification data 26, user trait information 30, or any combination thereof. In some embodiments, each time the de-anonymization algorithm 54 runs, the de-anonymization algorithm 54 may query the third-party user information databases 78a-78n with all of the anonymous user identification data 26 saved to the user profiles 62a-62n. In other embodiments, a subset of the anonymous user identification data 26 saved to user profiles 62a-62n may be used to query the third-party user information databases 78a-78n. For example, in some embodiments, the de-anonymization algorithm 54 may preferentially send the newest anonymous user identification data 26 to the third-party user information databases 78a-78n.

The de-anonymization algorithm 54 may repeat the steps shown in blocks 82-122 a predetermined number of times.

Figure 3:
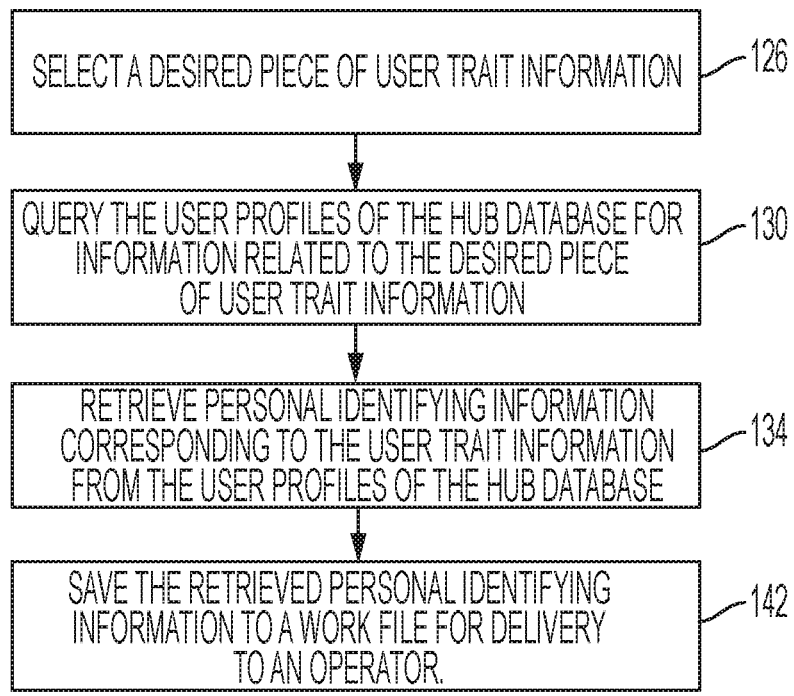
FIG. 3 illustrates a flow diagram of a method for retrieving personal identifying information corresponding to user profiles that include a specific characteristic.

FIG. 3 illustrates a flow diagram illustrating the operations performable to retrieve personal identifying information 22 corresponding to the user profiles 62a-62n that include a desired piece of user trait information 30 or a group of pieces of user trait information 30a-30n. As an initial step, a desired piece of user trait information 30 is selected (block 126). The hub database 38 is queried for the user profiles 62a-62n that include the desired user trait 30 (block 130). Responsive to identifying a user profile 62a-62n that includes the user trait 30, the de-anonymization algorithm 54 retrieves the personal identifying information 22 from the user profile 62 (block 134). The de-anonymization algorithm 54 saves the retrieved personal identifying information 22 in a work file 138 for delivery to an operator (block 142). In some embodiments, the work file 138 includes all of the personal identifying information 22 associated with the user profile 62. In other embodiments, the de-anonymization algorithm 54 only returns a specific type of personal identifying information 22. In such embodiments, the de-anonymization algorithm 54 may search for user profiles 62a-62n that include the desired type of personal identifying information 22 simultaneously with searching for user profiles 62a-62n that include the desired user trait information 30 at block 130. In other embodiments, the de-anonymization algorithm 54 retrieves only the desired type of personal identifying information 22 from the work file 138 before the work file 138 is delivered to the operator.

In some embodiments, if the de-anonymization algorithm 54 does not return any user profiles 62a-62n that meet the user trait information 30 specified in the query, or if the number of user profiles 62a-62n returned by the de-anonymization algorithm 54 is less than a minimum number of user profiles 62a-62n, the de-anonymization algorithm 54 queries the third-party user information databases 78a-78n using the anonymous user identification data 26 stored in the user profiles 62a-62n as described above with respect to FIG. 2 to add new user data 10 to the hub database 38. The de-anonymization algorithm 54 is then re-run using the user trait information 30 specified in the query to return the personal identifying information 22 stored in the user profiles 62a-62n that include the specified user trait information 30.

By way of example, an operator may be interested in knowing the postal addresses of people interested in buying a new car. Such an operator may request user trait information 30 indicative of people interested in buying new cars, such as for example previous browsing of car dealership websites, filing an insurance claim related to an car accident, ownership of old cars, and people approaching their $16^{th}$ birthday. The de-anonymization algorithm 54 would query the hub database 38 for the user trait information 30 of interest and return the personal identifying information 22 stored in the user profiles 62a-62n that include the user trait information 30 of interest. If the operator has indicated an interest in a specific type of personal identifying information 22, such as a postal address, only the postal addresses stored in the user profiles 62a-62n that include user trait information 30 of interest would be returned to the operator.

In some embodiments, the de-anonymization algorithm 54 may be used to differentiate between people who share a piece of personal identifying information 22 or the de-anonymization algorithm 54 may be used to retrieve a second piece of personal identifying information 22 based on a first piece of personal identifying information 22. In such a embodiment, both the shared personal identifying information 22 and a piece or pieces of user trait information 30 may be input to the de-anonymization algorithm 54, which would only return the personal identifying information 22 corresponding to the person who possesses both the queried piece of personal identifying information 22 and the user trait information 30.

For example, the de-anonymization algorithm 54 may be used to differentiate between family members who share a postal address. Specifically, if the operator wished to differentiate between the children and the adults living at shared postal address, the operator would input both the shared postal address and a desired age group (such as over 21 years old) into the de-anonymization algorithm 54. The de-anonymization algorithm 54 would query the hub database 38 using the shared postal address and the desired age group. The de-anonymization algorithm 54 would then output the personal identifying information 22 corresponding to the people at the shared postal address who fall within the appropriate age group.

Figure 4:
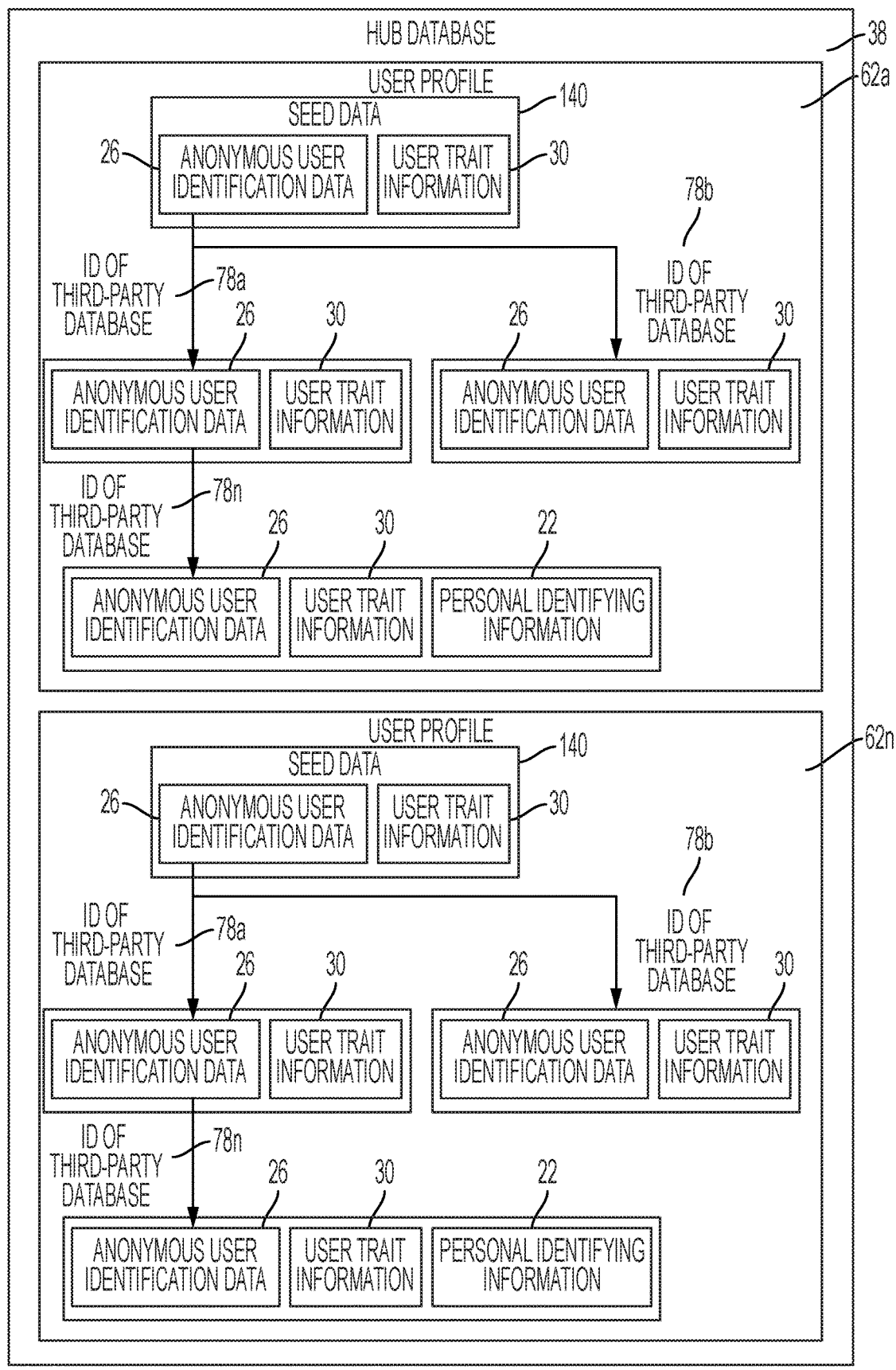
FIG. 4 is a schematic representation a hub database according to some embodiments.

FIG. 4 is a schematic representation of the organization of the user data 10 stored in the user profiles 62a-62n of the hub database 38. As shown in FIG. 4, the user profiles 62a-62n are named according to seed data 140 used to establish the user profile 62. The seed data 140 is a first piece of anonymous user identification data 26 found by the de-ananonymization algorithm 54 and used to establish the user profile 62a-62n. For example, when the seed data is a cookie 14a-14n, the name of the corresponding user profile 62a-62n is the name of the cookie 14a-14n. When the seed data is a hash value 34a-34n, the name of the corresponding user profile 62a-62n is the name of the hash value 34a-34n.

The user data 10 retrieved from the cookies 14a-14n and/or the third-party user information databases 78a-78n is saved to the user profiles 62a-62n stored in the hub database 38. The specific identity of any of the third-party user information databases 78a-78n that provided user data 10 is indexed to the user data 10. In some embodiments, each time the de-anonymization algorithm 54 is repeated, the newly-added anonymous user identification data 26 is sent to the third-party user information databases 78a-78n to find matches of the anonymous user identification data 26. If a match is found, the user data 10 corresponding to the matched anonymous user identification data 26 is saved to the user profile 62a-62n as a branch 150a-150n of the specific piece of anonymous user identification data 26 that was matched to retrieve the newly added user data 10. The specific third-party user information database 78a-78n that included the newly added user data 10 is saved to the user profile 62a-62n and indexed to the new user data 10. Accordingly, each user profile 62a-62n stored in the hub database 38 contains a web of user data 10 organized in a branched configuration in which each individual piece of user data 10 and the source (e.g. identity of the cookie 14a-14n or the third-party user information database 78a-78n) of the user data 10 used to find each piece of user data 10 is known.

The web structure of the hub database 38 allows the de-anonymization algorithm 54 to quickly query the hub database 38 for any type of user data 10 input by an operator. Since the user profiles 62a-62n include all available user data 10 known for each person, the hub database 38 may queried to return any type of user data 10 from the user profiles 62a-62n requested in a query.

Figure 5:
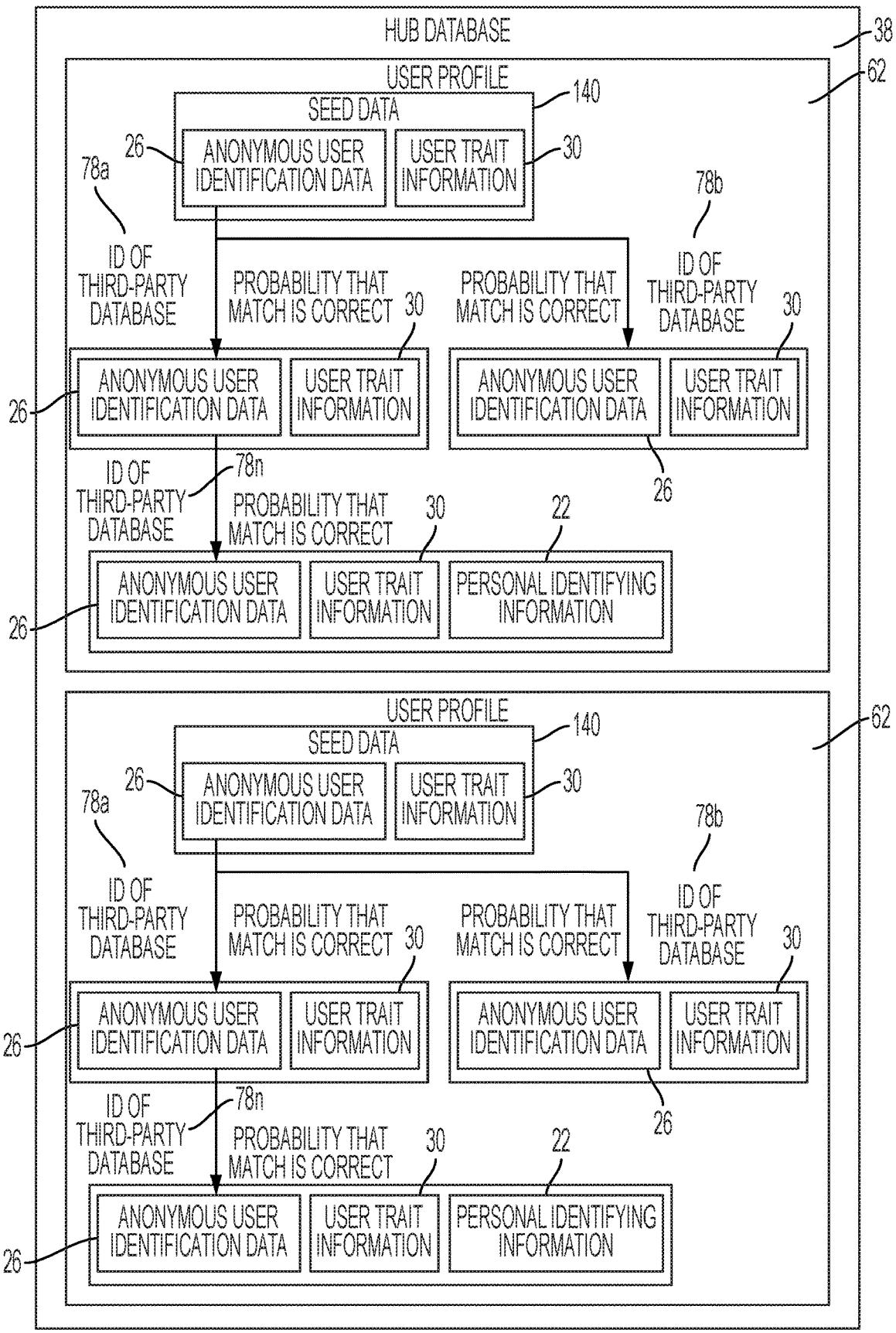
FIG. 5 is a schematic representation of a hub database according to another embodiment.
Figure 6:
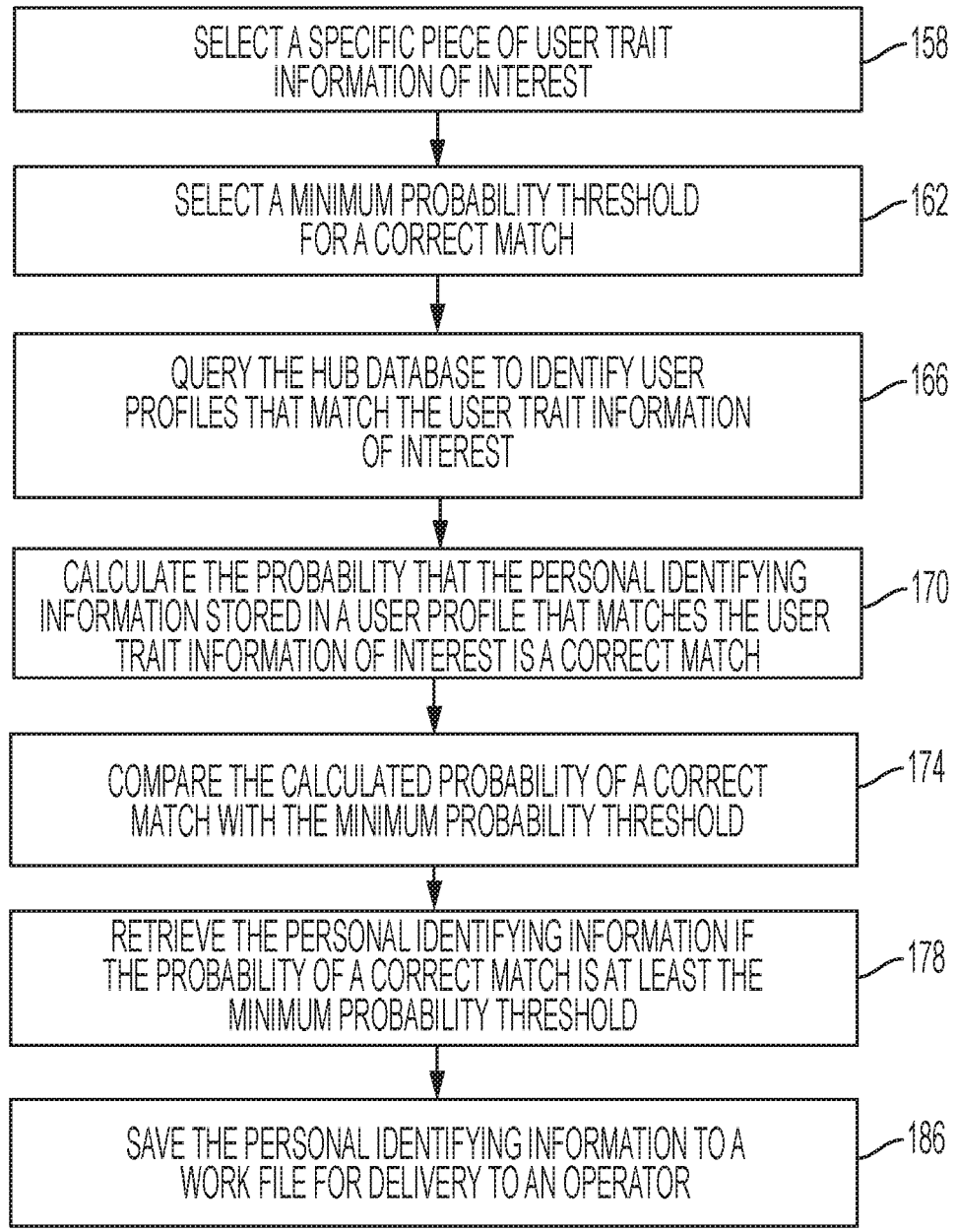
FIG. 6 illustrates a flow diagram of a method for retrieving personal identifying information corresponding to user profiles that include a specific characteristic with a specified probability of accuracy.

FIG. 5 is a schematic representation of the organization of the user data 10 in the user profiles 62a-62n of the hub database 38 according to an alternate embodiment. As illustrated in FIG. 6, for every match between a piece of anonymous user identification data 26 stored in the user profile 62a-62n and a subsequent match to another piece of user data 10 stored in the user profile 62a-62n, a probability that the match is correct is calculated and saved to a branch 154a-154n linking the matched pieces of user data 10. The identity of the third-party user information database 78a-78n that included the subsequent piece of user data 10 is also saved to the branch 154a-154n. In such a embodiment, the probability that a specific piece of personal identifying information 22 or a specific piece of user trait information 30 is a correct match to the seed data used to generate the user profile 62a-62n may be calculated by multiplying the match correctness probabilities stored in each branch 154a-154n between the seed data and the piece of personal identifying information 22 or the user trait information 30 of interest. The probability that the personal identifying information 22 or the user trait information 30 is correct may be saved to the hub database 38 for each piece of personal identifying information 22 or user trait information 30.

FIG. 6 illustrates a flow diagram showing the operations performable to retrieve the personal identifying information 22 corresponding to the user profiles 62a-62n that include a desired piece of user data 10, such as user trait information 30 or a group of pieces of user trait information 30 that have a specific probability of being a correct match to the retrieved personal identifying information 22. A specific piece of user trait information 30 or a group of pieces of user trait information 30 is selected (block 158). A specific minimum probability of a correct match between the user trait information 30 queried and the personal identifying information 22 returned by the de-anonymization algorithm 54 is selected (block 162). The hub database 38 is queried using de-anonymization algorithm 54 to identify the user profiles 62a-62n that match the user trait information 30 included in the query (block 166). Responsive to identifying the user profiles 62a-62n that include the queried user trait information 30, the de-anonymization algorithm 54 computes the probability that the queried user trait information 30 is a correct match to the personal identifying information 22 saved to the user profile 62a-62n. This probability is calculated by multiplying the probability that the personal identifying information 22 information is a correct match to the seed data 140 of the user profile 62a-62n with the probability that the user trait information 30 is a correct match to the seed data 140 of the user profile 62a-62n (block 170). The de-anonymization algorithm 54 then compares the probability that the match is correct to the minimum probability threshold selected in block 162 (block 174). If the probability of a correct match is above the minimum probability threshold, the de-anonymization algorithm 54 retrieves the personal identifying information 22 from the hub database 38 (block 178). The de-anonymization algorithm 54 saves the retrieved personal identifying information 22 to a work file 182 for delivery to an operator (block 186).

In some embodiments, the work file 190 includes all of the personal identifying information 22 associated with the user profile 62a-62n that meets the minimum acceptable probability threshold. In other embodiments, the hub database 38 only returns the user profiles 62a-62n that include a specific type of personal identifying information 22. In such embodiments, the de-anonymization algorithm 54 may search for the user profiles 62a-62n that include the desired type of personal identifying information 22 simultaneously with searching for the user profiles 62a-62n that include the desired type of user trait information 30 selected at block 158. In other embodiments, the de-anonymization algorithm 54 retrieves only the desired type of personal identifying information 22 from the work file 182 for delivery to the operator.

By way of example, an operator may be interested in knowing the postal addresses of people interested in buying a new car, but the operator does not want to contact people who are not interested in buying a new car. Such an operator may use the de-anonymization algorithm 54 would request user trait information 30 indicative of people interested in buying new cars, such as for example previous browsing to car dealership websites, filing an insurance claim related to an car accident, ownership of old cars, people approaching their $16^{th}$ birthday, and the operator would also input a minimum correct match probability of, for example 0.90.

The de-anonymization algorithm 54 would query the hub database 38 for the user trait data 30 of interest and return the personal identifying information 22 stored in the user profiles 62a-62n that include the user trait information 30 of interest. If the operator has indicated an interest in a specific piece of personal identifying information 22, such as a postal address, only the postal addresses stored in the user profiles 62a-62n that include user trait information 30 of interest would be returned to the operator and the probability that the match between the user trait information 30 of interest and the personal identifying information 22 of the person was at least 0.90.

In some embodiments, the de-anonymization algorithm 54 may be used to differentiate between people who share a piece of personal identifying information 22 or the de-anonymization algorithm 54 may be used to retrieve a second piece of personal identifying information 22 based on a first piece of personal identifying information 22. In such a embodiment, both the shared personal identifying information 22 and a piece or pieces of user trait information 30 may be input to the de-anonymization algorithm 54, which would only return the personal identifying information 22 corresponding to the person who possesses both the queried piece of personal identifying information 22 and the user trait information 30.

Various embodiments of a system and method for asynchronous correlation of data entries in spatially separated instances of heterogeneous databases, as described herein, may be executed on one or more computer systems 700, which may interact with various other devices. In the illustrated embodiment, the computer system 700 includes one or more processors 705 coupled to a system memory 710 via an input/output (I/O) interface 715. The computer system 700 further includes a network interface 720 coupled to I/O interface 715, and one or more input/output devices 725, such as cursor control device, keyboard, and display(s). In some cases, it is contemplated that embodiments may be implemented using a single instance of computer system 700, while in other embodiments multiple such systems, or multiple nodes making up computer system 700, may be configured to host different portions or instances of embodiments. For example, in one embodiment some elements may be implemented via one or more nodes of computer system 700 that are distinct from those nodes implementing other elements.

In various embodiments, computer system 700 may be a uniprocessor system including one processor 705a, or a multiprocessor system including several processors 705a-705n (e.g., two, four, eight, or another suitable number). The processors 705 may be any suitable processor capable of executing instructions. For example, in various embodiments the processors 705 may be general-purpose or embedded processors implementing any of a variety of instruction set architectures (ISAs), such as the x86, PowerPC, SPARC, or MIPS ISAs, or any other suitable ISA. In multiprocessor systems, each of processors 705 may commonly, but not necessarily, implement the same ISA.

The system memory 710 may be configured to store the program instructions 730 and/or existing state information and ownership transition condition data in the data storage 735 accessible by the processor 705. In various embodiments, the system memory 710 may be implemented using any suitable memory technology, such as static random access memory (SRAM), synchronous dynamic RAM (SDRAM), nonvolatile/Flash-type memory, or any other type of memory. In the illustrated embodiment, the program instructions 730 may be configured to implement a system for performing data reception and aggregation operations incorporating any of the functionality, as described herein. In some embodiments, program instructions and/or data may be received, sent, or stored upon different types of computer-accessible media or on similar media separate from the system memory 710 or the computer system 700. The computer system 700 is described as implementing at least some of the functionality of functional blocks of previous Figures.

In one embodiment, the I/O interface 715 may be configured to coordinate I/O traffic between the processor 705, the system memory 710, and any peripheral devices in the device, including the network interface 720 or other peripheral interfaces, such as the input/output devices 725. In some embodiments, the I/O interface 715 may perform any necessary protocol, timing or other data transformations to convert data signals from one component (e.g., the system memory 710) into a format suitable for use by another component (e.g., the processor 705). In some embodiments, the I/O interface 715 may include support for devices attached through various types of peripheral buses, such as a variant of the Peripheral Component Interconnect (PCI) bus standard or the Universal Serial Bus (USB) standard, for example. In some embodiments, the function of the I/O interface 715 may be split into two or more separate components, such as a north bridge and a south bridge, for example. Also, in some embodiments some or all of the functionality of the I/O interface 715, such as an interface to the system memory 710, may be incorporated directly into the processor 705.

The network interface 720 may be configured to allow data to be exchanged between the computer system 700 and other devices attached to the network 105 or between nodes of the computer system 700. The network 105 may in various embodiments include one or more networks including but not limited to Local Area Networks (LANs) (e.g., an Ethernet or corporate network), Wide Area Networks (WANs) (e.g., the Internet), wireless data networks, some other electronic data network, a combination thereof, or the like. In various embodiments, the network interface 720 may support communication via wired or wireless general data networks, such as any suitable type of Ethernet network, for example; via telecommunications/telephony networks such as analog voice networks or digital fiber communications networks; via storage area networks such as Fiber Channel SANs, or via any other suitable type of network and/or protocol.

The input/output devices 725 may, in some embodiments, include one or more display terminals, keyboards, keypads, touchpads, scanning devices, voice, or optical recognition devices, or any other devices suitable for entering or accessing data by one or more the computer systems 700. Further, various other sensors may be included in the I/O devices 725, such as imaging sensors, barometers, altimeters, LIDAR, or any suitable environmental sensor. Multiple input/output devices 725 may be present in the computer system 1100 or may be distributed on various nodes of the computer system 700. In some embodiments, similar input/output devices may be separate from the computer system 700 and may interact with one or more nodes of the computer system 700 through a wired or wireless connection, such as over the network interface 720.

Figure 7:
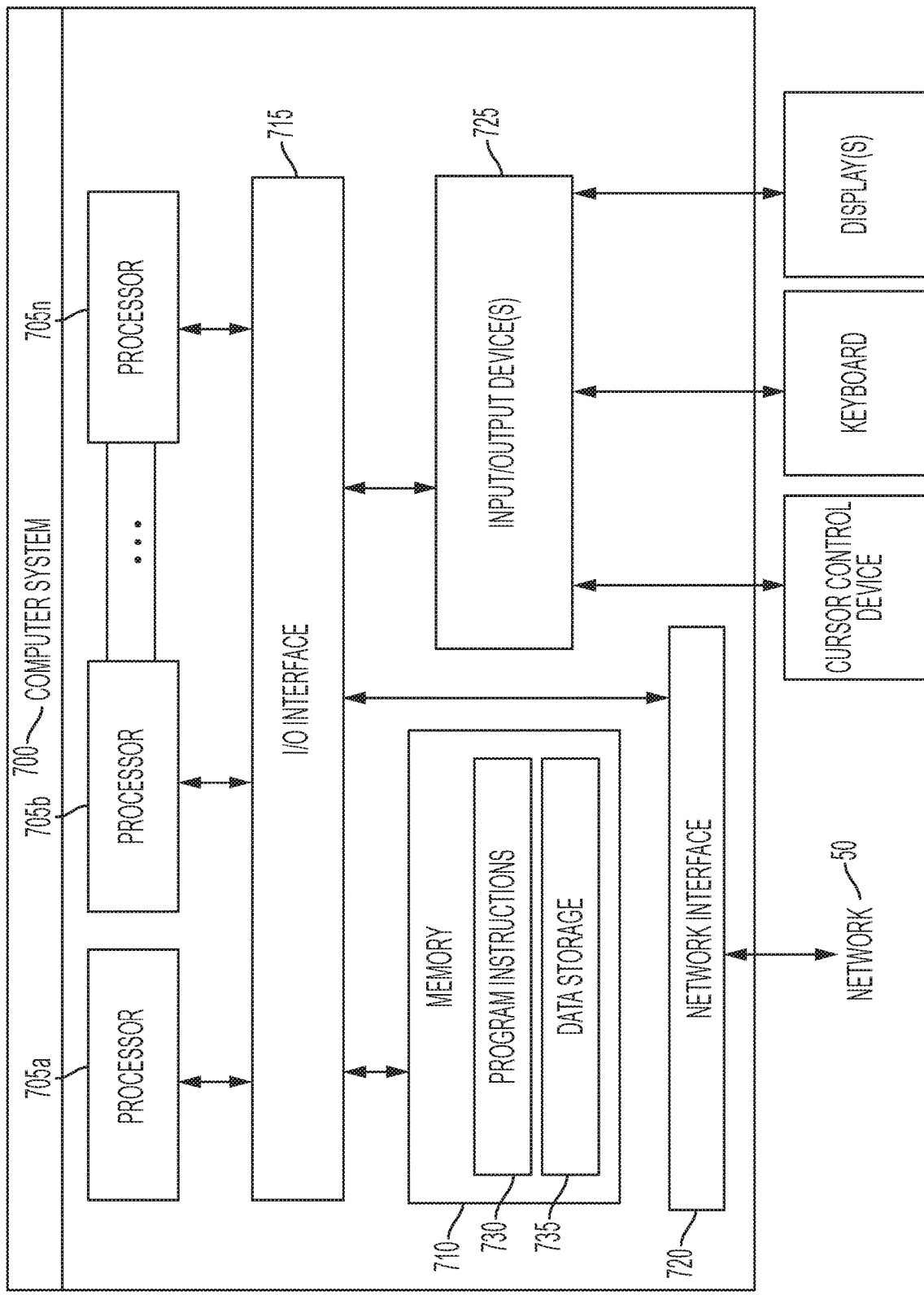
FIG. 7 is a schematic representation of a computer system usable for performing asynchronous correlation of data entries in spatially separated instances of heterogeneous databases according to another embodiment.

As shown in FIG. 7, the memory 710 may include program instructions 730, which may be processor-executable to implement any element or action, as described herein. In one embodiment, the program instructions may implement at least a portion of methods described herein, such as the methods illustrated by FIGS. 3-11. In other embodiments, different elements and data may be included. Note that the data storage 735 may include any data or information, as described herein.

Those skilled in the art will appreciate that the computer system 700 is merely illustrative and is not intended to limit the scope of embodiments. In particular, the computer system and devices may include any combination of hardware or software that can perform the indicated functions, including computers, network devices, Internet appliances, PDAs, wireless phones, pagers, GPUs, specialized computer systems, information handling apparatuses, or the like. The computer system 700 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions, structured data) on a computer-accessible medium or a portable article to be read by an appropriate drive, various examples of which are described here. In some embodiments, instructions stored on a computer-accessible medium separate from the computer system 700 may be transmitted to the computer system 700 through transmission media or signals such as electrical, electromagnetic, or digital signals, conveyed via a communication medium such as a network and/or a wireless link. Various embodiments may further include receiving, sending, or storing instructions and/or data implemented in accordance with the foregoing description upon a computer-accessible medium. Generally speaking, a computer-accessible medium may include a non-transitory, computer-readable storage medium or memory medium such as magnetic or optical media, e.g., disk or DVD/CD-ROM, volatile or non-volatile media such as RAM (e.g., SDRAM, DDR, RDRAM, SRAM, or the like), ROM, or the like. In some embodiments, a computer-accessible medium may include transmission media or signals such as electrical, electromagnetic, or digital signals, conveyed via a communication medium such as network and/or a wireless link.

None of the description in this application should be read as implying that any particular element, step, or function is an essential element that must be included in the claim scope. The scope of patented subject matter is defined only by the claims. Moreover, none of the claims is intended to invoke 35 U.S.C. § 112(f) unless the exact words "means for" are followed by a participle Various features and advantages of the disclosure are set forth in the following claims.

What is claimed is:

1. A computer-implemented method comprising:
forming a first user information database stored on a first server by retrieving, from a browser session, a first piece of user information that includes at least local user identification data and storing the first piece of user information in a user profile of the first user information database, wherein the first piece of user information corresponds to a user;
querying the first user information database for a second piece of user information;
responsive to not identifying the second piece of user information in the first user information database, querying a second user information database stored on a second server for the second piece of user information associated with the first piece of user information;
retrieving the second piece of user information from the second database;
saving the second piece of user information to the user profile of the first user information database;
calculating a probability that the second piece of user information corresponds to the user;
comparing the probability to a predetermined probability threshold; and
providing the second piece of user information to a consumer when the probability that the second piece of user information corresponds to the user exceeds the predetermined probability threshold based on the comparison.

2. The computer-implemented method of claim 1, wherein the first piece of information includes a cookie or a hash value.

3. The computer-implemented method of claim 1, wherein the second piece of user information includes at least anonymous user identification data related to the first piece of user information, and the method further comprises:
querying a third user information database stored on a third server, the third user information database different than the second user information database, with the second piece of user information; and
identifying a match in the third database, and saving the third piece of user information to the user profile in the first user information database and saving an identity of the third user information database indexed to the third piece of user information in the first user information database.

4. The computer implemented method of claim 3, wherein the third piece of user information includes personal identifying information.

5. The computer-implemented method of claim 4, wherein the personal identifying information includes one of a gender, a postal address, an age group, or a user interest.

6. The computer implemented method of claim 3, wherein the method further comprises providing both the first piece of user information and the second piece of user information to one or more consumer.

7. The computer implemented method of claim 3, further comprises calculating a probability that the third piece of user information corresponds to the user.

8. The computer implemented method of claim 7, further comprising providing the third piece of user information to one or more consumers if the probability that the third piece of user information corresponds to the user is at least a predetermined probability.

9. A non-transitory, computer-readable storage medium storing one or more executable instructions that, when executed by at least one processor, causes the at least one processor to:
form a first user information database stored on a first server by retrieving, from a browser session, a first piece of user information that includes at least local user information data and storing the first piece of user information in a user profile of the first user information database;

query the first user information database for a second piece of user information;

responsive to not identifying the second piece of user information in the first user information database, query a second user information database stored on a second server for the second piece of user information associated with the first piece of user information; and retrieve the second piece of user information from the second database and save the second piece of user information to the user profile of the first user information database and save an identity of the second user information database indexed to the second piece of user information in the first user information database.

10. The non-transitory, computer-readable storage medium of claim 9, wherein the first piece of information includes a cookie or a has value.

11. The non-transitory, computer-readable storage medium of claim 9, wherein the second piece of user information includes at least anonymous user identification data related to the first piece of user information, and the non-transitory, computer-readable storage medium storing one or more executable instructions that, when executed by at least one processor, causes the least one processor to:

query a third user information database stored on a third server, the third user information database different than the second user information database, with the second piece of user information, and identify a match in the third database, and save the third piece of user information to the user profile in the first user information database.

12. The non-transitory, computer-readable storage medium of claim 11, wherein the third piece of user information includes personal identifying information.

13. The non-transitory, computer-readable storage medium of claim 12, wherein the personal identifying information includes one of a gender, a postal address, an age group, or a user interest.

14. The non-transitory, computer-readable storage medium of claim 11, wherein the non-transitory, computer-readable storage medium storing one or more executable instructions further includes instructions that, when executed by at least one processor, cause the at least one processor to provide both the first piece of user information and the second piece of user information to a consumer.

15. The non-transitory, computer-readable storage medium of claim 11, wherein the first piece of user information corresponds to a user, and the non-transitory, computer-readable storage medium storing one or more executable further includes instructions that, when executed by at least one processor, causes the at least one processor to calculate a probability that the third piece of user information corresponds to the user.

16. The non-transitory, computer-readable storage medium of claim 15, the non-transitory, computer-readable storage medium storing one or more executable instructions further includes instructions that, when executed by at least one processor, cause the at least one processor to provide the third piece of user information to a consumer if the probability that the third piece of user information corresponds to the user is at least a predetermined probability.

17. A system comprising:

a first server in communication with a first computing system including a first memory and at least one processor; and a second server in communication with a second computing system, the second computing system including a second memory and a second processor, the second server in communication with the first server;

wherein the first memory comprises program instructions executable by the at least one processor of the first computing system to:

form a first user information database stored on the first server by retrieving, from a browser session, a first piece of user information that includes at least local user identification data and storing the first piece of user information in a user profile of the first user information database;

query the first user information database for a second piece of user information;

responsive to not identifying the second piece of user information in the first user information database, query a second user information database stored on the second server for the second piece of user information associated with the first piece of user information;

retrieve the second piece of user information from the second database and save the second piece of user information to the user profile of the first user information database and save an identity of the second user information database indexed to the second piece of user information in the first user information database;

calculate a probability that the second piece of user information corresponds to the user;

compare the probability to a predetermined probability threshold; and provide the second piece of user information to a consumer when the probability that the second piece of user information corresponds to the user exceeds the predetermined probability threshold based on the comparison.

18. The system of claim 17, wherein the first piece of information includes a cookie or a hash value.

19. The system of claim 17, wherein the second piece of user information includes at least anonymous user identification data related to the first piece of user information, and the first memory comprises program instructions executable by the at least one processor of the first computing system to:

query a third user information database stored on a third server, the third user information database different than the second user information database, with the second piece of user information;

identify a match in the third database; and save the third piece of user information to the user profile in the first user information database.

20. The system of claim 19, wherein the third piece of user information includes personal identifying information.

* * * * *